Figure 1:
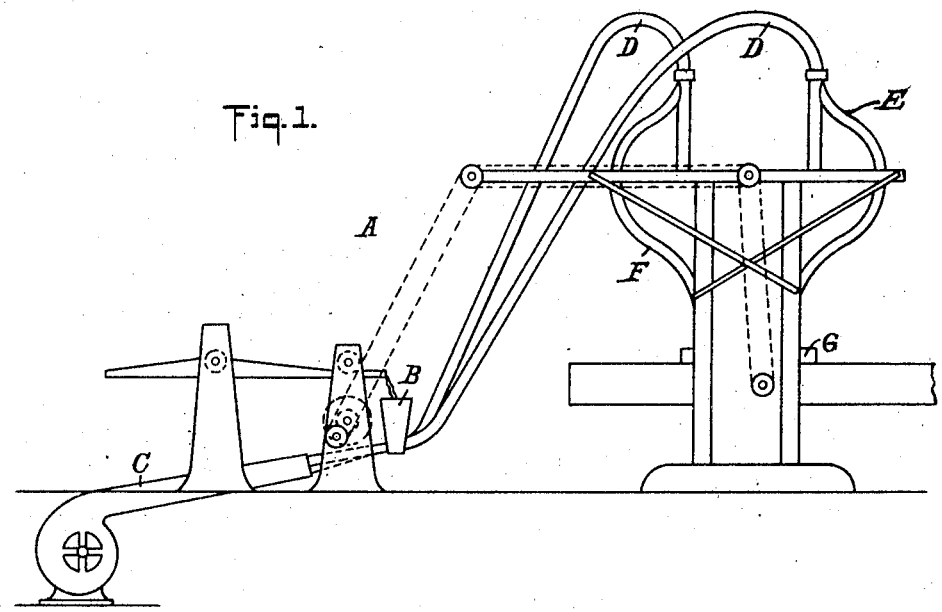

K. GAMMEL.
PROCESS FOR FORMING NOODLES.
APPLICATION FILED JULY 1, 1916. RENEWED JULY 9, 1919.

1,331,753.  Patented Feb. 24, 1920.

WITNESSES

INVENTOR
Karl Gammel
BY
Messner & Austin
ATTORNEYS

UNITED STATES PATENT OFFICE.

KARL GAMMEL, OF CLEVELAND, OHIO, ASSIGNOR TO THE CLEVELAND MACARONI COMPANY, OF CLEVELAND, OHIO.

PROCESS FOR FORMING NOODLES.

1,331,753.  Specification of Letters Patent.  Patented Feb. 24, 1920.

Application filed July 1, 1916, Serial No. 106,992. Renewed July 9, 1919. Serial No. 309,782.

*To all whom it may concern:*

Be it known that I, KARL GAMMEL, a citizen of the United States, and resident of Cleveland, in the county of Cuyahoga and State of Ohio, have invented certain new and useful Improvements in Processes for Forming Noodles, of which the following is a specification.

My invention relates in general to an economical and simplified process for handling edible products, such as semi-wet pastes and specifically relates to a process for forming noodle nests from these pastes.

Noodles are formed at present by passing the stiff dough through suitable rollers to form a thin layer which is fed through a cutting machine designed to divide the layer into strips.

The strips as they come from the cutting machine are in the form of flat ribbons, about an eighth of an inch wide; about one-sixty-fourth of an inch thick and about fifteen inches long. These strips are passed from the cutting machine into a draft of air directed to blow the strips along the length of a long table. One or more operators are lined along the far end of the table and take up enough of the strips to form the desired size noodle. By a finger manipulation the strips are interlaced and gathered into an open-work bunch thereby to form the commercial size nests. These nests are of a general irregularly shaped, flat cone, somewhat oval in plane, having dimensions of about two inches along the major axis and about an inch and one-half thick at the center but it is quite obvious that the shape is somewhat immaterial and that no two nests are of exactly the same shape, but all resemble each other in the well-opened character of the finally formed mass of gathered strips. Hand made noodle nests are sometimes more or less pressed together to thick lumps which is bad for the drying process and, therefore, are not appetizing.

This manual handling, especially on a large scale, is unsatisfactory for numerous reasons; there is a lack of uniformity in the products produced; the action is slow and therefore expensive, besides the product is apt to become discolored through the slow handling and the contact with the persons about the table is very apt to be unsanitary.

Accordingly one of the objects of my invention is to provide a simple and easily worked method for receiving the strips of edible pastes as they are delivered by the strip forming machine and to curve or interlace these strips into a more or less set open-work nest or noodle, similar to the manually formed noodles hereinbefore described, but formed entirely by a mechanical mechanism and thus free from contact with any operator.

The invention further contemplates both an economic handling of the strips from one machine to another and a rapid forming of the noodles on a large commercial scale with a minimum expenditure of power and without subjecting the paste to any extensive handling or any such drying action as would cause the formation of crusts or result in any final cracking of the products.

By my improved method, the ribbons of paste, in the substantially parallel arrangement received from the cutting machine, are fed into a continued draft, or preferably into the line of a sudden puff, of air and projected through a confined space, such as a tube, for a limited distance. The action of these ribbons as they pass through the tube is peculiar; certain parts of the ribbons appear to travel faster than other parts; a bending and squirming of the strips take place and there results something in the nature of an interlacing of the strips or, perhaps more accurately, a bending of the strips about each other. The rear ends of the strips seem to advance on the forward gathered portions causing the strips to bunch into their final noodle shape. This air movement of the paste is terminated, preferably by causing the delivery ends of the tubes to be shaped so as to deposit the noodles onto an intercepting member, such as a receiving table or tray. As the strips are fed to the intercepting member they are somewhat flattened to assume the form hereinbefore described, and preferably the distributing machine is designed to deposit the formed noodle nest conveniently in spaced apart order on a suitable traveling drying tray.

The nests thus formed are afterward subjected to a succeeding slow drying treatment usual with paste drying operations of this character but this succeeding drying treatment forms no part of the invention defined in this application.

Figure 2:
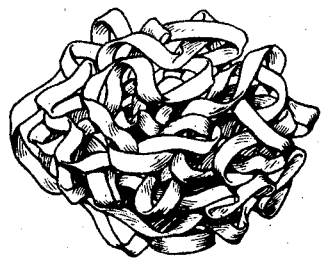

For the purpose of illustrating one form of mechanism particularly designed for the commercial working of the process, reference is made to applicant's copending application, Serial No. 91625 filed April 17, 1916, on a noodle laying machine, but for the purpose of this disclosure reference is made to the accompanying drawings which show in Figure 1 a diagrammatic view, in side elevation, of a machine capable of use in practising the process, Fig. 2 is an enlarged plan view of one of the nested noodles formed by this process.

In the drawings there is shown a conventional form of dough cutting machine A, designed to roll and cut the flat sheets of dough longitudinally and transversely in the desired size of strips and to feed these strips or ribbons into a receiving hopper B as is usual in devices of this character. A blower C is arranged in operative relation to the hopper B to subject the strips of dough to a sudden puff or blast of air, which air may be taken from the outside, if the humidity thereof is proper, or the air may be heated in its passage past the blower by any of the usual air heating means if it is desired to subject the noodles to a dry air treatment while forming the same. The action of the air on the strips causes the same to travel forwardly with the air current through one of the projecting tubes D to a distributing machine E. This forward movement of the strips appears to suspend the same in the propelling air and the air seems to hold one portion of the strips while folding or wrapping another portion about the held portion or portions. The strips or rather noodles are then caused to fall through the downwardly inclined tubes F from which they are deposited on a drying tray G positioned below the discharge ends of the tubes F.

While the machine illustrated in the copending application has been worked out with much detail, it is understood that in so far as this process is concerned, it is merely necessary to have some means for limiting the transverse movement of the noodles while projecting the same longitudinally to have some means for supplying air to propel the products bodily and at the same time to form the nests during this propelling movement and to have some form of intercepting means for receiving the formed nests.

By means of a process of this character the paste is handled practically without contact with any of the operators and practically without contact with any portion of the machine for the movement thereof through the tubes so quick that the paste does not have time to settle to the bottom of the guiding tubes. The paste may be passed from one machine to another without any necessity for the operator touching the same thus insuring not only a sanitary condition but also providing a uniformity of treatment for the different batches of product passed through the machines.

Although I have shown one form of apparatus for carrying out my process, it will be evident that various changes can be made therein without departing from the spirit of the invention, provided the steps set forth in the following claims be employed.

Having thus described my invention, I claim:

1. In the art of forming noodles, the process which consists in propelling a plurality of strips of edible paste longitudinally by pneumatic pressure while confining their movements laterally thereby causing the strips to interlace and to form into a nest.

2. In the art of forming noodles, the process which consists in propelling a plurality of strips longitudinally by pneumatic pressure while confining their movements laterally thereby causing the strips to interlace and finally intercepting the movement of the interlaced strips thereby to cause the nest formed during the movement of the strips to flatten slightly.

3. In the art of handling edible paste strips, the process which consists in subjecting a certain number of strips to the action of a confined column of air while permitting the strips to travel freely with the air thereby to form a nest.

4. In the art of forming edible paste noodles, the process which consists in subjecting a plurality of floating strands of the paste to the action of an air current while confining the movements of the projected strands in all directions transversely of their line of movement and intercepting the movement of the noodles.

Signed at Cleveland in the county of Cuyahoga, and State of Ohio this 16 day of May, A. D. 1916.

KARL GAMMEL.

Witnesses:
J. H. VAN DERVEER,
E. M. HOLMGREN.